United States Patent
Li et al.

(10) Patent No.: US 12,445,536 B2
(45) Date of Patent: Oct. 14, 2025

(54) MIDDLEWARE FOR COMMUNICATION BETWEEN MICROSERVICES AND MONOLITHIC APPLICATION

(71) Applicant: SAP SE, Walldorf (DE)

(72) Inventors: Hui Li, Shanghai (CN); Xia Yu, Shanghai (CN); Dabin Feng, Shanghai (CN); Neng Gan, Shainghai (CN); Zhen Zhang, Shanghai (CN)

(73) Assignee: SAP SE, Walldorf (DE)

( * ) Notice: Subject to any disclaimer, the term of this patent is extended or adjusted under 35 U.S.C. 154(b) by 35 days.

(21) Appl. No.: 18/454,207

(22) Filed: Aug. 23, 2023

(65) Prior Publication Data
US 2025/0071191 A1 Feb. 27, 2025

(51) Int. Cl.
*H04L 67/63* (2022.01)
*G06F 9/54* (2006.01)

(52) U.S. Cl.
CPC .............. *H04L 67/63* (2022.05); *G06F 9/547* (2013.01)

(58) Field of Classification Search
CPC ................................ H04L 67/63; G06F 9/547
USPC ......................................................... 709/201
See application file for complete search history.

(56) References Cited

U.S. PATENT DOCUMENTS

| | | | |
|---|---|---|---|
| 6,907,546 B1* | 6/2005 | Haswell | G06F 11/3684 717/124 |
| 12,212,475 B1* | 1/2025 | Dickey | H04L 41/0816 |
| 12,294,524 B2* | 5/2025 | Shah | H04L 12/66 |
| 2017/0041288 A1* | 2/2017 | Stotski | G06F 9/5077 |
| 2021/0286640 A1* | 9/2021 | Zengerle | G06F 16/1734 |
| 2021/0383248 A1* | 12/2021 | Schimpfky | G06F 17/18 |
| 2023/0019974 A1* | 1/2023 | Iyengar | G06F 1/3209 |
| 2023/0129107 A1* | 4/2023 | Bokhman | G06F 12/0891 711/135 |
| 2023/0195528 A1* | 6/2023 | Fargo | G06F 9/5077 718/104 |
| 2023/0195547 A1* | 6/2023 | Carranza | G06F 9/54 719/328 |
| 2024/0143335 A1* | 5/2024 | Wouhaybi | G06F 9/44 |
| 2024/0356762 A1* | 10/2024 | Kim | G06F 21/6218 |
| 2024/0362151 A1* | 10/2024 | Kunz | G06F 11/3688 |
| 2024/0364772 A1* | 10/2024 | Josyula | H04L 41/5032 |
| 2025/0062979 A1* | 2/2025 | Srinivasan | H04L 45/122 |
| 2025/0062990 A1* | 2/2025 | Srinivasan | H04L 45/64 |

* cited by examiner

*Primary Examiner* — Tauqir Hussain
(74) *Attorney, Agent, or Firm* — Fish & Richardson P.C.

(57) ABSTRACT

Methods, systems, and computer-readable storage media for receiving, from a first entity, a first call, the call being received by a middleware client of a second entity, storing a set of headers associated with a workflow in a request context holder of the middleware client, and determining that a second call is to be executed from the middleware client of the second entity for the workflow, and in response: reading, by a client of the middleware client, the set of headers associated with the workflow, including the headers in a request of the second call, determining an endpoint for the second call, and transmitting the second call for receipt at the endpoint.

20 Claims, 5 Drawing Sheets

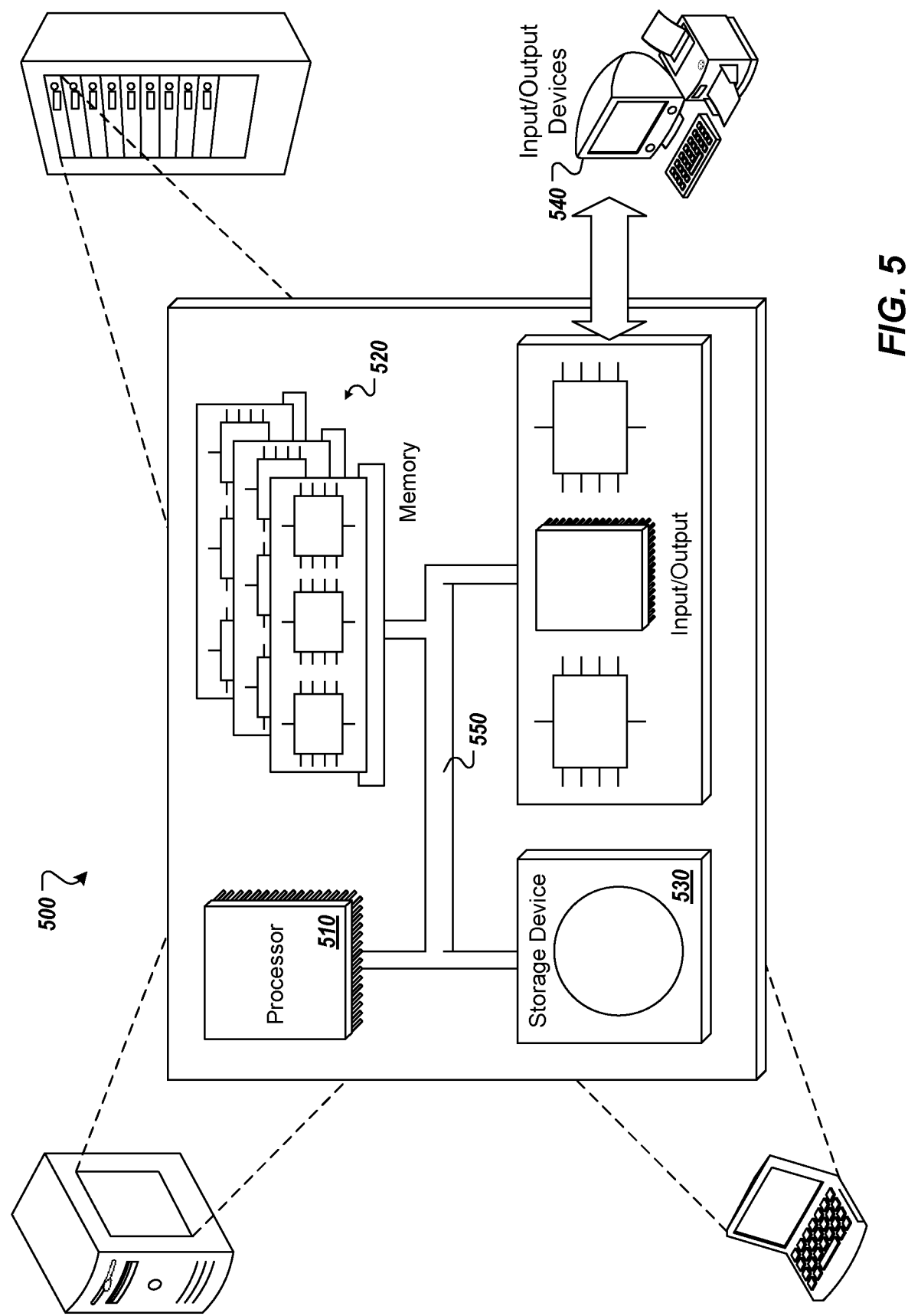

MIDDLEWARE FOR COMMUNICATION BETWEEN MICROSERVICES AND MONOLITHIC APPLICATION

BACKGROUND

As software architectures are modernized, legacy systems become outdated. For example, legacy applications have been provided as monolithic applications executing on an application server. Such applications can include millions of lines of code distributed over hundreds of development components. Each application executes on a server system (e.g., an application server), which server systems can also become outdated. Microservice-based architectures have been introduced, which provide advantages over traditional software architectures. For example, microservice-based architectures enable continuous enhancement of functionality without re-implementation, and parallel code lines that traditional architectures may require.

SUMMARY

Implementations of the present disclosure are directed to communication between microservices and a monolithic application. More particularly, implementations of the present disclosure are directed to a middleware client, referred to herein as an application programming interface (API) client (APIClient), that is deployed at each of the monolithic application and the microservices. In some examples, the APIClient includes a uniform resource locator (URL) register for each interface, a request context holder for a current workflow, a hypertext transfer protocol (HTTP) client for remote calls, and a resilience configuration.

In some implementations, actions include receiving, from a first entity, a first call, the call being received by a middleware client of a second entity, storing a set of headers associated with a workflow in a request context holder of the middleware client, and determining that a second call is to be executed from the middleware client of the second entity for the workflow, and in response: reading, by a client of the middleware client, the set of headers associated with the workflow, including the headers in a request of the second call, determining an endpoint for the second call, and transmitting the second call for receipt at the endpoint. Other implementations of this aspect include corresponding systems, apparatus, and computer programs, configured to perform the actions of the methods, encoded on computer storage devices.

These and other implementations can each optionally include one or more of the following features: the first entity is one of the monolithic application and a microservice; actions further include comparing headers of the first call with an allow list, and for each header matching at least one of a header name and a header pattern of the allow list, including the header in the set of headers; reading the set of headers includes reading the set of headers from request context holder indexed based on the workflow; determining the endpoint for the second call includes determining a value from a uniform resource locator (URL) register using a relative URL as an index to the URL register, the value including a portion of the endpoint, and providing the endpoint by combining the value and the relative URL into a full URL; the URL register is stored in a URL register cache of the middleware client and is refreshed in response to a change in the URL register; and actions further include applying a resilience configuration to the second call, the resilience configuration being determined based on a set of resilience instances and a mapping that maps a relative URL to one or more resilience instances in the set of resilience instances.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

FIG. 5 is a schematic illustration of example computer systems that can be used to execute implementations of the present disclosure.

Like reference symbols in the various drawings indicate like elements.

DETAILED DESCRIPTION

Figure 1:
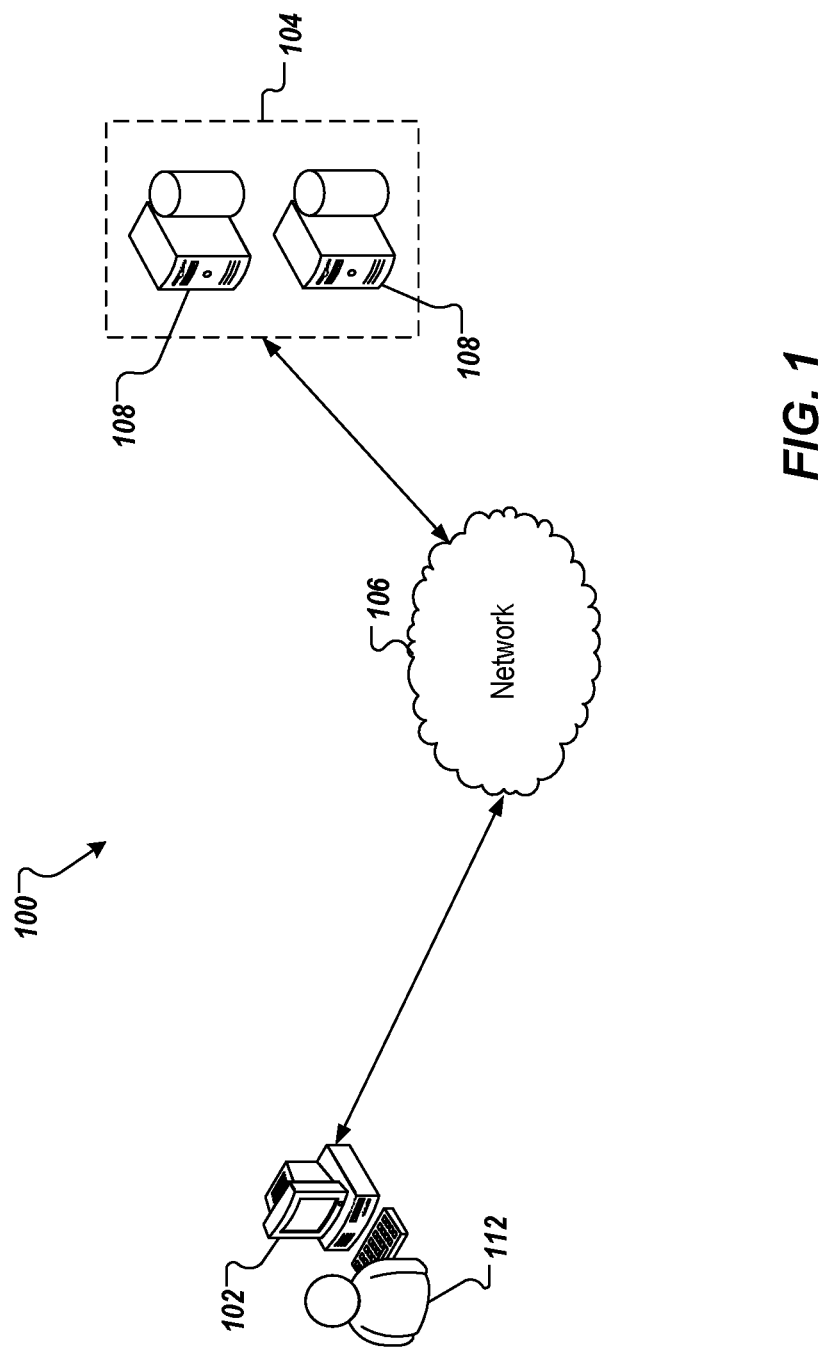
FIG. 1 depicts an example architecture that can be used to execute implementations of the present disclosure.

Implementations of the present disclosure are directed to communication between microservices and a monolithic application. More particularly, implementations of the present disclosure are directed to a middleware client, referred to herein as an application programming interface (API) client (APIClient), that is deployed at each of the monolithic application and the microservices. In some examples, the APIClient includes a uniform resource locator (URL) register for each interface, a request context holder for a current workflow, a hypertext transfer protocol (HTTP) client for remote calls, and a resilience configuration. Implementations can include actions of receiving, from a first entity, a first call, the call being received by a middleware client of a second entity, storing a set of headers associated with a workflow in a request context holder of the middleware client, and determining that a second call is to be executed from the middleware client of the second entity for the workflow, and in response: reading, by a client of the middleware client, the set of headers associated with the workflow, including the headers in a request of the second call, determining an endpoint for the second call, and transmitting the second call for receipt at the endpoint.

To provide further context for implementations of the present disclosure, and as introduced above, as software architectures are modernized, legacy systems become outdated. For example, legacy applications have been provided as monolithic applications executing on an application server. Such applications can include millions of lines of code distributed over hundreds of development components. Each application executes on a server system (e.g., an application server), which server systems can also become outdated. Microservice-based architectures have been introduced, which provide advantages over traditional software architectures. For example, microservice-based architectures enable continuous enhancement of functionality without re-implementation, and parallel code lines that traditional architectures may require.

Commonly, software architectures of monolithic applications are relatively complex. As a result, breaking a monolithic application into microservices can require several iterations of refactoring, while still not completely converting the entirety of the monolithic application into microservices. In some examples, with each release of a monolithic application, one or more components of the monolith are converted to respective microservices that interact with the monolithic application. For example, an example electronic commerce (e-commerce) application (monolithic application) can be considered for purposes of non-limiting illustration. In this example, the e-commerce application contains many components, such as customer, inventory, supplier, booking, delivery, billing, and the like. Before migration to microservices, all of the components communicate using native method calls. In one example, a new release of the e-commerce application peels off the supplier, delivery, and billing from the monolith and reallocates them to respective microservices.

In such examples where the monolithic software functionality is divided between the monolith and one or more microservices, the microservices need to communicate with each other and the monolith by remote call. Accordingly, one workflow will contain several remote calls across multiple microservices and/or the monolithic application. For example, an example workflow can include a request to the e-commerce application (monolithic application), which issues a remote call to the supplier service and a remote call to the delivery service. In this example, the delivery service issues a remote call to the billing service and the billing service issues a remote call to the e-commerce application.

However, technical challenges arise in managing request routing, request context (e.g., authorization, tracing), and resilience (e.g., circuit breaker, rate limiter, retry, bulkhead) for each of the remote calls in a workflow. While there are some existing frameworks that provide out-of-the-box features to manage routing, context, and resilience for microservices, such frameworks are difficult, if not impossible to be applied in instances where a monolithic application remains part of the workflow.

In view of the foregoing, implementations of the present disclosure provide a middleware client for communication between microservices and monolithic applications to enable management of routing, context, and resilience in workflow execution. In some implementations, and as described in further detail herein, the middleware client, also referred to herein as an APIClient, is deployed at each of the monolithic application and the microservices. In some examples, the APIClient includes a URL register for each interface, a request context holder for a current workflow, a HTTP client for remote calls, and a resilience configuration.

FIG. 1 depicts an example architecture 100 in accordance with implementations of the present disclosure. In the depicted example, the example architecture 100 includes a client device 102, a network 106, and a server system 104. The server system 104 includes one or more server devices and databases 108 (e.g., processors, memory). In the depicted example, a user 112 interacts with the client device 102.

In some examples, the client device 102 can communicate with the server system 104 over the network 106. In some examples, the client device 102 includes any appropriate type of computing device such as a desktop computer, a laptop computer, a handheld computer, a tablet computer, a personal digital assistant (PDA), a cellular telephone, a network appliance, a camera, a smart phone, an enhanced general packet radio service (EGPRS) mobile phone, a media player, a navigation device, an email device, a game console, or an appropriate combination of any two or more of these devices or other data processing devices. In some implementations, the network 106 can include a large computer network, such as a local area network (LAN), a wide area network (WAN), the Internet, a cellular network, a telephone network (e.g., PSTN) or an appropriate combination thereof connecting any number of communication devices, mobile computing devices, fixed computing devices and server systems.

In some implementations, the server system 104 includes at least one server and at least one data store. In the example of FIG. 1, the server system 104 is intended to represent various forms of servers including, but not limited to a web server, an application server, a proxy server, a network server, and/or a server pool. In general, server systems accept requests for application services and provides such services to any number of client devices (e.g., the client device 102 over the network 106).

In accordance with implementations of the present disclosure, and as noted above, the server system 104 can host a monolithic application and one or more microservices. In some examples, each microservice performs some functionality that had been previously performed by the monolithic application. As described in further detail herein, each of the monolithic application and the microservices has an APIClient executing therewith, which enables remote calls therebetween during execution of workflows.

Figure 2:
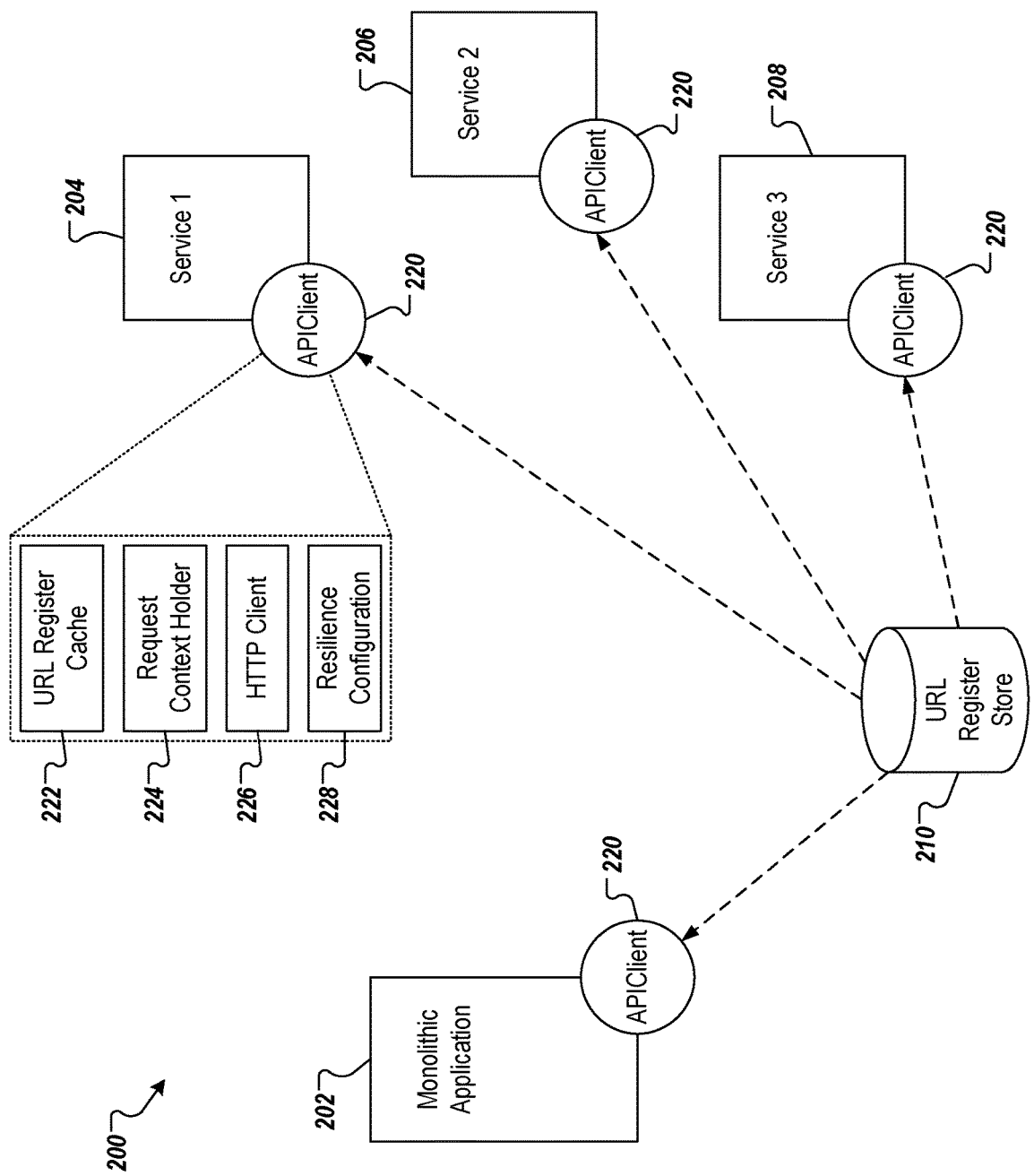
FIG. 2 depicts an example conceptual architecture in accordance with implementations of the present disclosure.

FIG. 2 depicts an example conceptual architecture 200 in accordance with implementations of the present disclosure. In the depicted example, conceptual architecture 200 includes a monolithic application 202, a first microservice 204, a second microservice 206, a third microservice 208, and a URL register store 210. Although three microservices are depicted in the example of FIG. 2, it is contemplated that any appropriate number of microservices can be included. In some examples, each of the first microservice 204, the second microservice 206, and the third microservice 208 perform respective functionality that had previously been performed by the monolithic application 202.

In accordance with implementations of the present disclosure, each of the monolithic application 202, the first microservice 204, the second microservice 206, and the third microservice 208 executes with an APIClient 220. In some implementations, each APIClient 220 includes a URL register cache 222, a request context holder 224, an HTTP client 226, and a resilience configuration 228.

Implementations of the present disclosure are described in further detail herein with non-limiting reference to the example e-commerce application implemented primarily as a monolith but where the supplier functionality, delivery functionality, and billing functionality have been peeled off and are provided as microservices. In this non-limiting example, and with reference to FIG. 2, the e-commerce application is the monolithic application 202, the supplier functionality is executed by the first microservice 204 (e.g., supplier service), the delivery functionality is executed by the second microservice 206 (e.g., delivery service), and the billing functionality is executed by the third microservice 208 (e.g., billing service). In this example, the e-commerce application can retain certain functionality (e.g., customer, inventory, booking).

In some implementations, the URL register store 210 is a standalone data store (e.g., ETCD, Zookeeper, Consul) that functions as a registry for the URLs of each of the monolithic application 202, the first microservice 204, the second microservice 206, and the third microservice 208. In some examples, the data structure of the URL register 210 is a key-value map, where the key is the URL pattern of a respective interface for remote calls, and the value is the endpoint (e.g., monolithic application, microservice) that provides the interface. For example, and with non-limiting reference to the e-commerce application, an example key-value map is provided in Table 1:

TABLE 1

Example URL Register Data Structure

| Key | Value |
| --- | --- |
| /rest/supplier.svc/* | http://supplier.svc.sf.priv |
| /rest/delivery.svc/* | http://delivery.svc.sf.priv |
| /rest/bill.svc/* | http://bill.svc.sf.priv |
| /rest/customer.svc/* | http://monolith.sf.priv |
| /rest/inventory.svc/* | http://monolith.sf.priv |
| /rest/booking.svc/* | http://monolith.sf.priv |

In the example of Table 1, each of the request URLs that start with/rest/supplier.svc/ will hit the microservice endpoint http://supplier.svc.sf.priv (i.e., the first microservice 204) and request URLs that start with /rest/customer.svc/,/rest/inventory.svc/, or/rest/booking.svc/, or will hit the monolithic application endpoint http://monolith.sf.priv (i.e., the monolithic application 202 (with the * in the above table representing a wildcard symbol which may be replaced using a specific reference via specific characters when implemented).

In some implementations, each APIClient 220 reads the URL register from the URL register store 210 and caches the URL register in local memory (e.g., in the URL register cache 222). In some examples, each APIClient 220 watches for and/or is informed of any changes to the URL register within the URL register store 210. In response to any chance, each APIClient 220 updates the URL register in its respective URL register cache 222 (e.g., cache refresh). In alternative examples, URL register store 210 pushes out updates to the various APIClients 220 whenever a change is made to the URL register store 210 or updates from URL register store 210 can be pushed to URL register cache(s) 222 on a periodic basis.

In some implementations, each APIClient 220 maintains an allow list of HTTP header names that are allowed to be passed to a next request of a workflow that is being executed. In some examples, the allow list is maintained by the request context holder 224 of the APIClient 220. An example allow list is provided in Table 2:

TABLE 2

Example Allow List

| Header Name/Header Pattern | Comment |
| --- | --- |
| AUTHORIZATION | Header for Authorization |
| COOKIE | Header to reuse the session |
| WORKFLOW-ID | Header of the current workflow |
| X-* | Any header which starts with X- |
| ABC-* | Any header which starts with ABC- |

It is appreciated that the allow list of Table 2 is a non-limiting example and allow lists of the present disclosure can include any appropriate header name and/or header pattern. In some examples, the header AUTHORIZATION and the header WORKFLOW-ID are kept for a next request of a current workflow. However, some headers (e.g., Content-Length) are not passed to the next request to avoid occurrence of errors.

In some implementations, the request context holder 224 maintains a thread-local variable, whose key is the current workflow and value is the headers of the current request. Once the current request hits the microservice (or the monolithic application), the request context holder will store the HTTP headers whose names are in allow list into the thread local variable. An example is provided in Table 3:

TABLE 3

Example Request Context Holder

| Key | Value | Example Value |
| --- | --- | --- |
| WORKFLOW_1 | Headers of WORKFLOW_1 whose name is in allow list | { "AUTHORIZATION": "Bear abc", "COOKIE": "ghj", "WORKFLOW-ID": "def", "X-UUID": "zxc", "SAP-TRANS-ID": "xxxx", } |
| WORKFLOW_2 | Headers of WORKFLOW_2 whose name is in allow list | |
| WORKFLOW_3 | Headers of WORKFLOW_3 whose name is in allow list | |
| WORKFLOW_4 | Headers of WORKFLOW_4 whose name is in allow list | |
| WORKFLOW_5 | Headers of WORKFLOW_5 whose name is in allow list | |

In some implementations, the HTTP client 226 enables the APIClient 220, and the respective monolithic application and/or microservice, to execute remote calls. In some examples, before the remote call is executed, the APIClient 220 prepares the request in the multiple steps. For example, in a first step, the APIClient 220 reads HTTP headers of the current workflow from the request context holder 224 and inserts them into the new request (i.e., the call that is to be issued from the APIClient 220). In a second step, the APIClient 220 finds the endpoint of the microservice or monolithic application based on a URL. For example, if the program wants to query the booking functionality by the relative URL/rest/booking.svc/Booking?name=abc, the APIClient 220 will find its endpoint is http://monolith.sf- .priv from the URL register cache 222, because the relative URL matches the pattern/rest/booking.svc/* (e.g., see Table 1). In this non-limiting example, the APIClient 220 can use HTTP headers of the current workflow to call the full URL http://monolith.sf.priv/rest/booking.svc/Booking?name=abc.

Figure 3:
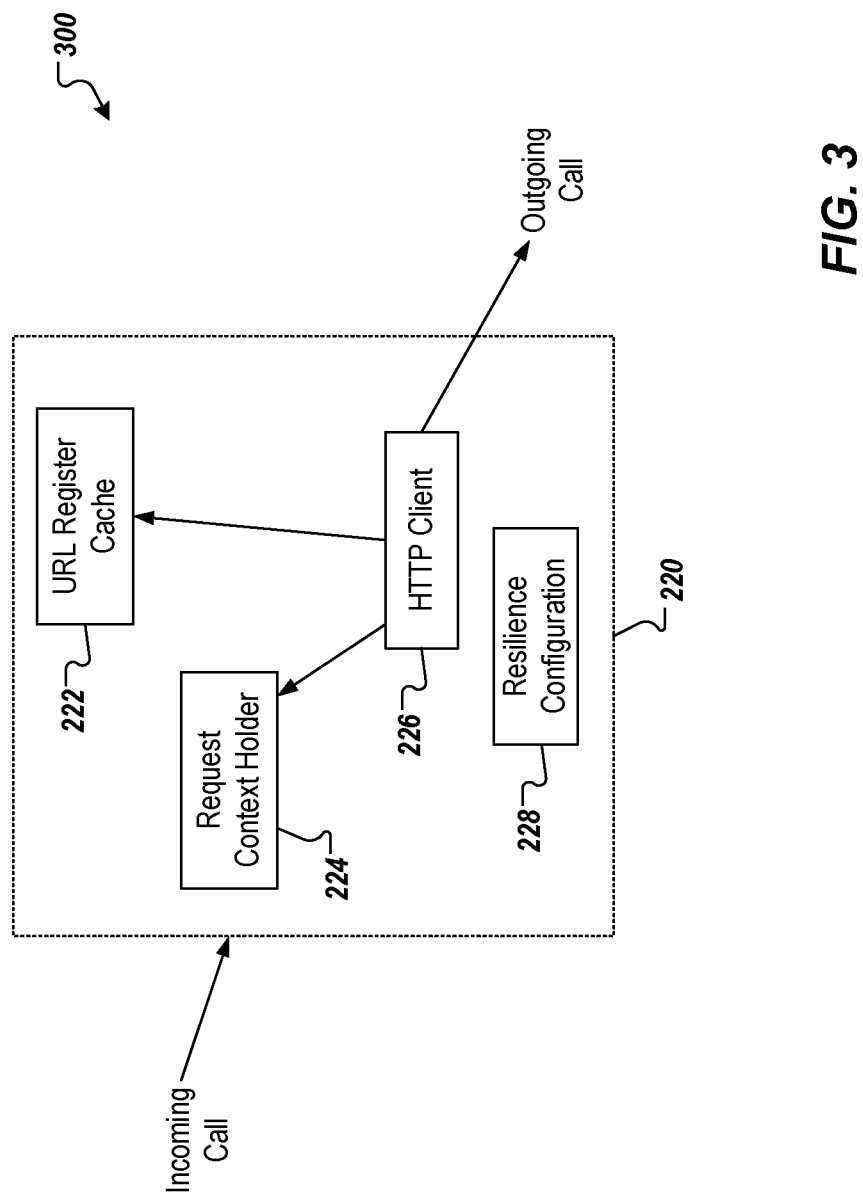
FIG. 3 depicts example interactions between components of the middleware of the present disclosure.

In further detail, FIG. 3 depicts example interactions 300 between components of the middleware of the present disclosure. In the example of FIG. 3, a first call (request) is received by the APIClient 220, the first call initiating execution of a workflow. In some examples, the first call is received by a microservice from another microservice or the monolithic application. In some examples, the first call is received by the monolithic application from a microservice. In response to receiving the first call, the APIClient 220 stores headers of the workflow into the request context holder 224.

In some examples, the monolithic application or the microservice that received the first call performs some functionality in furtherance of the workflow. In some examples, the monolithic application or the microservice that received the first call issues a second call. For example, the monolithic application can receive the first call, perform some functionality, and issue the second call (e.g., to a microservice). As another example, a microservice can receive the first call, perform some functionality, and issue the second call (e.g., to a microservice).

In some implementations, the HTTP client 226 reads headers of the workflow from the request context holder 224 and uses a relative URL to read the service endpoint (that is to receive the second call) from the URL register cache 222 to provide a full URL (e.g., using the relative URL/rest/booking.svc/Booking?name=abc to provide the full URL http://monolith.sf.priv/rest/booking.svc/Booking?name=abc). The HTTP client 226 uses the headers of the workflow for the second call to the full URL.

In some implementations, the resilience configuration 228 provides resilience for calls. In some examples, an open-source resilience library (e.g., Residence4j, Hystrix, Sentinel) can be integrated with the HTTP client 226. In accordance with implementations of the present disclosure, the APIClient 220 uses multiple resilience configurations. In some examples, a first resilience configuration defines resilience instances and a second resilience configuration is for mapping URLs to resilience instances. In some examples, each microservice and/or monolithic application can define its resilience configurations. That is, the resilience configurations can be specific to the calling entity (e.g., monolithic application, microservice). In some examples, the resilience configurations can be provided in a file format (e.g., YAML, JSON, XML). An example configuration file to define resilience instances has the properties shown in Table 4:

TABLE 4

Example Resilience Instances

| Resilience Type | Property | Comment |
| --- | --- | --- |
| CircuitBreaker | waitDurationInOpenState | The wait duration which specifies how long the CircuitBreaker should stay open. |
| | slowCallDurationThreshold | The duration threshold above which calls are considered as slow and increase the rate of slow calls. |
| | failureRateThreshold | The failure rate threshold in percentage. If the failure rate is equal to or greater than the threshold the CircuitBreaker transitions to open and starts short-circuiting calls. |
| | slowCallRateThreshold | The slow calls threshold in percentage. The CircuitBreaker considers a call as slow when the call duration is greater than slowCallDuration Threshold. |
| | slidingWindowSize | The size of a sliding window. The sliding window can either be count-based or time-based |
| | minimumNumberOfCalls | The minimum number of calls that must be recorded before the failure rate can be calculated |
| | recordExceptions | A list of exceptions that are recorded as a failure and thus increase the failure rate. |
| | ignoreExceptions | A list of exceptions that are ignored and neither count as a failure nor success. |
| RateLimiter | timeoutDuration | The default wait time for a thread waits for a permission |
| | limitRefreshPeriod | The period of a limit refresh. After each period the rate limiter sets its permissions count back to the limitForPeriod value |
| | limitForPeriod | Count of permissions available during one rate limiter period. |
| Retry | maxAttempts | The maximum number of retry attempts |
| | waitDuration | A fixed wait duration between retry attempts |

TABLE 4-continued

Example Resilience Instances

| Resilience Type | Property | Comment |
| --- | --- | --- |
| | enableExponentialBackoff | Flag to enable Exponential backoff policy for retry. true or false |
| | exponentialBackoffMultiplier | The multiplier for exponential backoff policy for retry |
| | retryExceptions | A list of exceptions that are recorded as a failure and thus are retried. |
| | ignoreExceptions | A list of exceptions that are ignored and thus are not retried. |
| Bulkhead | maxConcurrentCalls | Max amount of parallel executions allowed by the SemaphoreBulkhead |
| | maxWaitDuration | Max amount of time a thread should be blocked for when attempting to enter a saturated SemaphoreBulkhead. |

Listings 1 and 2 provide an example URL mapping to resilience instances:

```
/ /Define resilience instances
resilience4j.circuitbreaker:
  configs:
    default:
      failureRateThreshold: 50
      slowCallRateThreshold: 50
      slowCallDurationThreshold: 60000ms
      permittedNumberOfCallsInHalfOpenState: 100
      slidingWindowType: COUNT_BASED
      slidingWindowSize: 100
      minimumNumberOfCalls: 100
      waitDurationInOpenState: 60000ms
  instances:
    circuitbreaker_01:
resilience4j.ratelimiter:
  configs:
    default:
      timeoutDuration: 5s
      limitRefreshPeriod: 500ns
      limitForPeriod: 50
    shared_01:
      limitForPeriod: 51
  instances:
    ratelimiter_01:
resilience4j.retry:
  configs:
    default:
      maxAttempts: 3
      waitDuration: 500ms
      enableExponentialBackoff: true
      exponentialBackoffMultiplier: 1.5
  instances:
    retry_01:
      baseConfig: default
resilience4j.bulkhead:
  configs:
    default:
      maxWaitDuration: 0
      maxConcurrentCalls: 25
  instances:
    bulkhead_01:
      baseConfig: default
......
            Listing 1: Example Resilience Instances
/ /Define resilience instance mapping
resilience.client.mapping:
  - url-mapping: ["/rest/customer.svc/Account*",
"/rest/customer.svc/User*"]
    circuitbreaker-instance: circuitbreaker_01
    ratelimiter-instance: ratelimiter_01
    retry-instance: retry_01
    bulkhead-instance: bulkhead_01
      Listing 2: Example Mapping of URL to Resilience Instances
```

In view of the above examples, and for purposes of non-limiting illustration, for every request URL that starts with /rest/customer.svc/Account or /rest/customer.svc/User, the APIClient 220 will use the circuit breaker instance circuitbreaker_01, the rate limiter instance ratelimiter_01, the retry instance retry_01, and the bulkhead instance bulkhead 01.

Figure 4:
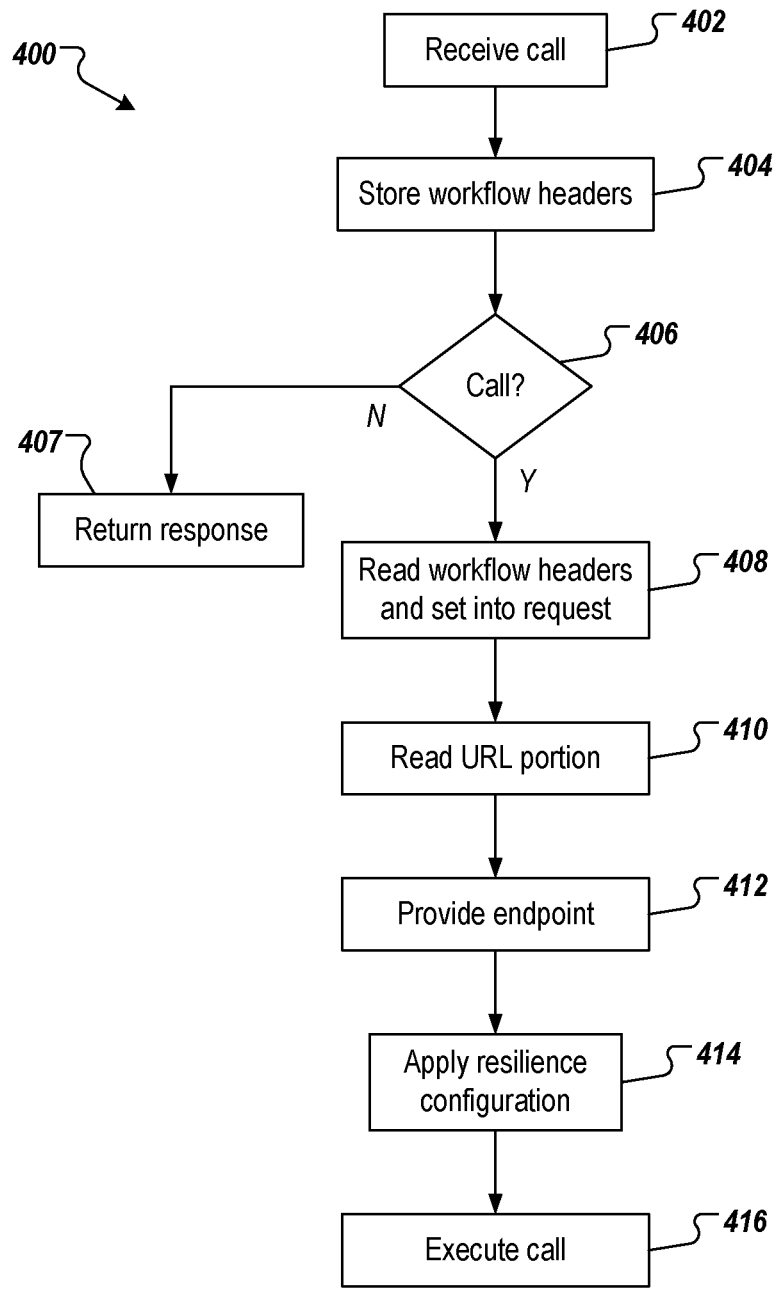
FIG. 4 depicts an example process that can be executed in accordance with implementations of the present disclosure.

FIG. 4 depicts an example process 400 that can be executed in accordance with implementations of the present disclosure. In some examples, the example process 400 is provided using one or more computer-executable programs executed by one or more computing devices.

A first call is received (402). For example, and as described herein, a monolithic application (e.g., the monolithic application 202 of FIG. 2) or a service (e.g., the first microservice 204, the second microservice 206, the third microservice 208 of FIG. 2) can receive a first call. In some examples, the first call includes a request to execute some functionality as part of a workflow. In some examples, the request includes a payload (e.g., data that can be processed by the functionality).

Workflow headers are stored (404). For example, and as described herein, the APIClient 220 of the entity that received the first call (e.g., monolithic application, service) can store the workflow headers in the request context holder 224. In some examples, the entity that received the first call (e.g., monolithic application, service) can execute functionality in response to the request of the first call (e.g., processing at least a portion of a payload). It is determined whether a second call is to be executed (406). For example, and as described herein, it can be determined whether the entity that received the first call (e.g., monolithic application, service) is to respond to the first call and/or send a request to another entity. For example, a microservice that received the first call can send a response to the entity that sent the first call. As another example, a microservice that received the first call can send a request to another microservice. If a second call is not to be executed, a response to the call is returned (407).

If a second call is to be executed, workflow headers are read and set into a request (408). For example, and as described herein, the HTTP client 226 reads the workflow headers for the workflow that is being executed from the request context holder 224, and sets the headers into the request. A URL portion is read (410) and an endpoint is provided (412). For example, and as described herein, the HTTP client 226 reads a portion of a URL for the entity (e.g., monolithic application, microservice) that is to receive the second call and provides the endpoint as a full URL based on a relative URL and the portion of the URL (e.g., using the relative URL/rest/booking.svc/Booking? name=abc to provide the full URL http://monolith.sf.priv/rest/booking.svc/Booking? name=abc). In some examples, a payload is provided for the request (e.g., data that is to be processed in furtherance of the workflow).

A resilience configuration is applied (414). For example, and as described herein, one or more relative URLs can be mapped to resilience configurations that are to be applied for the second call (e.g., /rest/customer.svc/Account and /rest/customer.svc/User are mapped to the circuit breaker instance circuitbreaker_01, the rate limiter instance ratelimiter_01, the retry instance retry_01, and the bulkhead instance bulkhead_01). The second call is executed (416). For example, and as described herein, the HTTP client 226 transmits the second call for receipt at the endpoint addressed in the full URL.

Referring now to FIG. 5, a schematic diagram of an example computing system 500 is provided. The system 500 can be used for the operations described in association with the implementations described herein. For example, the system 500 may be included in any or all of the server components discussed herein. The system 500 includes a processor 510, a memory 520, a storage device 530, and an input/output device 540. The components 510, 520, 530, 540 are interconnected using a system bus 550. The processor 510 is capable of processing instructions for execution within the system 500. In some implementations, the processor 510 is a single-threaded processor. In some implementations, the processor 510 is a multi-threaded processor. The processor 510 is capable of processing instructions stored in the memory 520 or on the storage device 530 to display graphical information for a user interface on the input/output device 540.

The memory 520 stores information within the system 500. In some implementations, the memory 520 is a computer-readable medium. In some implementations, the memory 520 is a volatile memory unit. In some implementations, the memory 520 is a non-volatile memory unit. The storage device 530 is capable of providing mass storage for the system 500. In some implementations, the storage device 530 is a computer-readable medium. In some implementations, the storage device 530 may be a floppy disk device, a hard disk device, an optical disk device, or a tape device. The input/output device 540 provides input/output operations for the system 500. In some implementations, the input/output device 540 includes a keyboard and/or pointing device. In some implementations, the input/output device 540 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier (e.g., in a machine-readable storage device, for execution by a programmable processor), and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, for example, a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for executing calls between a monolithic application and one or more microservices, the method being executed by one or more processors and comprising:
   receiving, from a first middleware client of a first entity, a first call, the first call being received by a second middleware client of a second entity, the first call comprising a set of headers descriptive of a workflow being executed between a monolithic application and a set of services;
   determining that the set of headers included in the first call are allowed headers, and in response:
      storing the set of headers in a request context holder of the second middleware client, the request context holder storing the set of headers as a key-value pair comprising a key that identifies the workflow and a value comprising the set of headers; and
   determining, by the second client, that a second call is to be executed from the second middleware client of the second entity for the workflow, and in response:
      reading, by the second middleware client, the set of headers descriptive of the workflow,
      including the set of headers in a request of the second call,
      determining an endpoint for the second call, and
      transmitting the second call for receipt at the endpoint.

2. The method of claim 1, wherein the first entity is one of the monolithic application and a microservice.

3. The method of claim 1, wherein determining that the set of headers included in the first call are allowed headers comprises:
   comparing headers of the first call with an allow list; and
   for each header matching at least one of a header name and a header pattern of the allow list, including the header in the set of headers.

4. The method of claim 1, wherein reading the set of headers comprises reading the set of headers from the request context holder indexed based on the workflow.

5. The method of claim 1, wherein determining the endpoint for the second call comprises:
   determining a value from a uniform resource locator (URL) register using a relative URL as an index to the URL register, the value comprising a portion of the endpoint; and
   providing the endpoint by combining the value and the relative URL into a full URL.

6. The method of claim 5, wherein the URL register is stored in a URL register cache of the second middleware client and is refreshed in response to a change in the URL register.

7. The method of claim 1, further comprising applying a resilience configuration to the second call, the resilience configuration being determined based on a set of resilience instances and a mapping that maps a relative URL to one or more resilience instances in the set of resilience instances.

8. A non-transitory computer-readable storage medium coupled to one or more processors and having instructions stored thereon which, when executed by the one or more processors, cause the one or more processors to perform operations for executing calls between a monolithic application and one or more microservices, the operations comprising:
   receiving, from a first middleware client of a first entity, a first call, the first call being received by a second middleware client of a second entity, the first call comprising a set of headers descriptive of a workflow being executed between a monolithic application and a set of services;
   determining that the set of headers included in the first call are allowed headers, and in response:
      storing the set of headers in a request context holder of the second middleware client, the request context holder storing the set of headers as a key-value pair comprising a key that identifies the workflow and a value comprising the set of headers; and
   determining, by the second client, that a second call is to be executed from the second middleware client of the second entity for the workflow, and in response:
      reading, by the second middleware client, the set of headers descriptive of the workflow,
      including the set of headers in a request of the second call,
      determining an endpoint for the second call, and
      transmitting the second call for receipt at the endpoint.

9. The non-transitory computer-readable storage medium of claim 8, wherein the first entity is one of the monolithic application and a microservice.

10. The non-transitory computer-readable storage medium of claim 8, wherein determining that the set of headers included in the first call are allowed headers comprises:
    comparing headers of the first call with an allow list; and
    for each header matching at least one of a header name and a header pattern of the allow list, including the header in the set of headers.

11. The non-transitory computer-readable storage medium of claim 8, wherein reading the set of headers comprises reading the set of headers from the request context holder indexed based on the workflow.

12. The non-transitory computer-readable storage medium of claim 8, wherein determining the endpoint for the second call comprises:
    determining a value from a uniform resource locator (URL) register using a relative URL as an index to the URL register, the value comprising a portion of the endpoint; and
    providing the endpoint by combining the value and the relative URL into a full URL.

13. The non-transitory computer-readable storage medium of claim 12, wherein the URL register is stored in a URL register cache of the second middleware client and is refreshed in response to a change in the URL register.

14. The non-transitory computer-readable storage medium of claim 8, wherein operations further comprise applying a resilience configuration to the second call, the resilience configuration being determined based on a set of resilience instances and a mapping that maps a relative URL to one or more resilience instances in the set of resilience instances.

15. A system, comprising:
    a computing device; and
    a computer-readable storage device coupled to the computing device and having instructions stored thereon which, when executed by the computing device, cause the computing device to perform operations for executing calls between a monolithic application and one or more microservices, the operations comprising:
       receiving, from a first middleware client of a first entity, a first call, the first call being received by a second middleware client of a second entity, the first call comprising a set of headers descriptive of a workflow being executed between a monolithic application and a set of services;

determining that the set of headers included in the first call are allowed headers, and in response:

storing the set of headers in a request context holder of the second middleware client, the request context holder storing the set of headers as a key-value pair comprising a key that identifies the workflow and a value comprising the set of headers; and determining, by the second client, that a second call is to be executed from the second middleware client of the second entity for the workflow, and in response:

reading, by the second middleware client, the set of headers descriptive of the workflow, including the set of headers in a request of the second call, determining an endpoint for the second call, and transmitting the second call for receipt at the endpoint.

16. The system of claim 15, wherein the first entity is one of the monolithic application and a microservice.

17. The system of claim 15, wherein determining that the set of headers included in the first call are allowed headers comprises:

comparing headers of the first call with an allow list; and for each header matching at least one of a header name and a header pattern of the allow list, including the header in the set of headers.

18. The system of claim 15, wherein reading the set of headers comprises reading the set of headers from the request context holder indexed based on the workflow.

19. The system of claim 15, wherein determining the endpoint for the second call comprises:

determining a value from a uniform resource locator (URL) register using a relative URL as an index to the URL register, the value comprising a portion of the endpoint; and providing the endpoint by combining the value and the relative URL into a full URL.

20. The system of claim 19, wherein the URL register is stored in a URL register cache of the second middleware client and is refreshed in response to a change in the URL register.

* * * * *